(12) United States Patent
Betts et al.

(10) Patent No.: US 7,792,855 B2
(45) Date of Patent: Sep. 7, 2010

(54) EFFICIENT STORAGE OF XML IN A DIRECTORY

(75) Inventors: Christopher Betts, Mount Dandenong (AU); Tony Rogers, Rowville (AU)

(73) Assignee: Computer Associates Think, Inc., Islandia, NY (US)

( * ) Notice: Subject to any disclaimer, the term of this patent is extended or adjusted under 35 U.S.C. 154(b) by 552 days.

(21) Appl. No.: 11/093,367

(22) Filed: Mar. 30, 2005

(65) Prior Publication Data

US 2005/0235197 A1 Oct. 20, 2005

Related U.S. Application Data

(63) Continuation of application No. 10/888,736, filed on Jul. 9, 2004, now abandoned.

(60) Provisional application No. 60/486,732, filed on Jul. 11, 2003.

(51) Int. Cl.
   *G06F 17/30* (2006.01)
   *G06F 7/00* (2006.01)
(52) U.S. Cl. .................... 707/769; 707/802; 715/234; 715/256
(58) Field of Classification Search .................. 707/3
   See application file for complete search history.

(56) References Cited

U.S. PATENT DOCUMENTS

| | | | | |
|---|---|---|---|---|
| 5,157,783 A * | 10/1992 | Anderson et al. | ............... | 707/4 |
| 6,591,260 B1 * | 7/2003 | Schwarzhoff et al. | ........... | 707/2 |
| 6,635,089 B1 * | 10/2003 | Burkett et al. | ............... | 715/513 |
| 6,910,029 B1 * | 6/2005 | Sundaresan | .................... | 707/2 |
| 7,162,691 B1 * | 1/2007 | Chatterjee et al. | ........... | 715/205 |
| 2001/0034733 A1 * | 10/2001 | Prompt et al. | ............... | 707/102 |
| 2002/0083087 A1 * | 6/2002 | Deuser et al. | ............... | 707/500 |
| 2002/0129153 A1 * | 9/2002 | Fleming | .................... | 709/230 |
| 2002/0174107 A1 * | 11/2002 | Poulin | ......................... | 707/3 |
| 2004/0230572 A1 * | 11/2004 | Omoigui | ........................ | 707/3 |
| 2005/0050030 A1 * | 3/2005 | Gudbjartsson et al. | ......... | 707/3 |
| 2005/0080766 A1 * | 4/2005 | Ghatare | ......................... | 707/3 |
| 2006/0047637 A1 * | 3/2006 | Meyerzon et al. | ............. | 707/3 |
| 2007/0016563 A1 * | 1/2007 | Omoigui | ........................ | 707/3 |
| 2007/0038610 A1 * | 2/2007 | Omoigui | ........................ | 707/3 |
| 2007/0112727 A1 * | 5/2007 | Jardine et al. | ................. | 707/3 |

OTHER PUBLICATIONS

P.J. Marron et al., "*On Processing XML in LDAP*", VLDB01 Proceedings of the 27th International Conference on Very Large Data Bases, Sep. 11, 2001, pp. 601-610, XP-002312724, Sep. 11, 2001.

Sihem Amer-Yahia and Mary Fernandez, "*Techniques for Storing XML*" Proceedings of the 18th Int. Conference on Data Engineering, XP-002312725, Feb. 26, 2002.

(Continued)

*Primary Examiner*—Greta L Robinson
*Assistant Examiner*—James J Wilcox
(74) *Attorney, Agent, or Firm*—Baker Botts L.L.P.

(57) ABSTRACT

A method for mapping an XML document to a directory includes providing an entry to the directory corresponding to the XML document, providing one or more search attributes to the entry containing one or more corresponding search terms, and providing a full-text attribute containing full text of the XML document to the entry.

12 Claims, 3 Drawing Sheets

```
41
┌─────────────────────────────────────────────────────────────────────────────┐
│ 42── book = A Tale of Two Cities                                             │
│ 43── tile = A Tale of Two Cities                                             │
│ 44── author = Charles Dickens                                                │
│ 45── fullXML =  <Book Title="A Tale of Two Cities">                          │
│                   <Author>Charles Dickens</Author>                           │
│                   <Body>It was the best of times, it was the worst of times...</Body> │
│                 </Book>                                                      │
│ 46── summary =  <Book Title="A Tale of Two Cities"> <Author>Charles Dickens</Author> │
└─────────────────────────────────────────────────────────────────────────────┘
```

OTHER PUBLICATIONS

Feng Tian et al., "*The Design and Performance Evaluation of Alternative XML Storage Strategies*" Sigmon Record, vol. 31, No. 1. pp. 5-10, XP-002312726, Mar. 2002.

P.J. Marron et al., "*HLCashes: An LDAP-based Distributed Cache Technology*" Technical Report, Institu Fur Informatik, Universitat Freiburg, No. 147, XP-002312727, Mar. 5, 2001.

K.L. Eddie Law: "*XML on LDAP Network Database*", Canadian Conference on Electrical and Computer Engineering, 2000, vol. 1, pp. 469-473, XP-002312728, Mar. 7, 2000.

D. Florescu et al., "*A Performance Evaluation of Alternative Mapping Schemes for Storing XML Data in a Relational Database*", Rapport De Recherche 3680, Inria Rocquencourt, XP-002168318, May 1999.

* cited by examiner

```
                                                      41
    ┌─────────────────────────────────────────────────┘──────────────────────────────┐
    │ 42 ~ book = A Tale of Two Cities                                               │
    │ 43 ~ tile = A Tale of Two Cities                                               │
    │ 44 ~ author = Charles Dickens                                                  │
    │ 45 ~ fullXML = <Book Title="A Tale of Two Cities">                             │
    │                  <Author>Charles Dickens</Author>                              │
    │                  <Body>It was the best of times, it was the worst of times...</Body> │
    │                </Book>                                                         │
    │ 46 ~ summary = <Book Title="A Tale of Two Cities"> <Author>Charles Dickens</Author> │
    └────────────────────────────────────────────────────────────────────────────────┘
```

FIG. 4

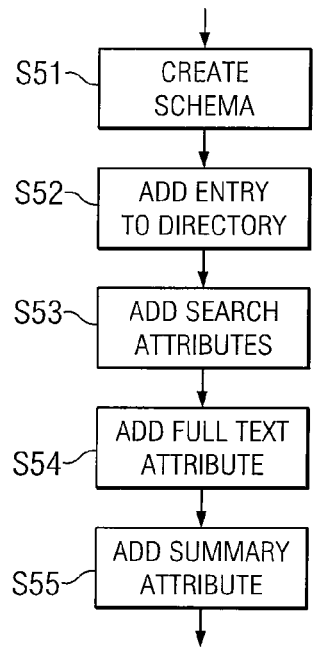

FIG. 5

EFFICIENT STORAGE OF XML IN A DIRECTORY

REFERENCE TO RELATED APPLICATION

This is a continuation of application Ser. No. 10/888,736 filed Jul. 9, 2004 now abandoned which claims the benefit of Provisional application No. 60/486,732 and filed in the United States on Jul. 11, 2003 the entire contents of which are herein incorporated by reference.

BACKGROUND

1. Technical Field

The present disclosure relates to XML and, more specifically, to storage of XML in a directory.

2. Description of the Related Art

Extensible Markup Language (XML) is a computer language for structured documents. Structured documents include documents that may contain content as well as descriptions and/or classifications of the content. For example, a structured document may be a book that includes a novel (the content) as well as a description of the novel (the title).

XML is a human-readable computer language. A human-readable computer language is a computer language where the source code may be viewed as standard text and a reader may be able to interpret the significance of the source code by examining the text. As a human-readable computer language, XML may be interpreted by a wide variety of computer platforms. This feature makes XML an excellent standard for data that is communicated between diverse programs, operating systems and computers.

XML documents may be made up of elements. Each element may be assigned any number of attributes. Attributes may have values. FIG. 1 is an example of an XML document. In this example, the XML document 11 may have an element called "Book" 12 with an attribute called "Title" 13 where the value of the Title attribute is "A Tale of Two Cities" 14.

XML content may be de scribed by using tags. Tags are descriptive captions that appear before and after content and may include attributes and values. Unlike some other computer languages where tags are predefined, such as hypertext markup language (HTML), XML tags may be user defined. XML can therefore use any number of tags to describe any form of content.

Each element in an XML document may be delineated by a start-tag 15 that is presented immediately before the element 12, and an end-tag 16 that is presented immediately after the element 12. XML documents may be hierarchical. Hierarchical XML documents may contain one or more child elements 17 and 18 within a parent element 12. An element is a child element if its tags are situated between the start-tag and end-tag of another element. An element is a parent element if the tags of another element are situated between the element's start-tag and end-tag. An element may be both a parent element and a child element as XML documents may have any number of hierarchical generations.

It is often desirable to store XML documents in a manner that allows for easy searching and retrieval of the XML document. The emergence of web services has increased the need to store a great number of XML documents.

Web services present a new way for computers to communicate with each other. Web services are software systems that can be identified by Universal Resource Identifiers (URI), analogous to identification of websites by Uniform Resource Locator (URL). Web services generally perform specialized functions or provide access to information. Web services generally contain public interfaces and bindings that enable other software systems (such as other web services) to seamlessly utilize its functionality. In this way, web services are transforming the way modern enterprises interact and share information.

Web services commonly communicate by exchanging data in the form of XML documents. Therefore as the popularity of web services increases, so does the desire to store and retrieve large numbers of XML documents.

One technique that has developed for the storage and retrieval of XML documents includes the use of directories. Directories are specialized databases that are primarily used for allowing a large number of users to quickly look up information. A directory is not intended to be primarily used as a tool for the organization and storage of data and is therefore optimized for information retrieval and not necessarily information storage. A directory service is a computer application that allows for access to a directory. While some directory services are local and only allow for use on a particular computer network, other directory services are global and allow for general access over a global computer network such as the internet.

Global directory services may spread information across multiple computer servers all of which cooperate to provide directory service. Such directory services are known as distributed directory services. The Internet Domain Name System (DNS) is an example of a globally distributed directory service. The DNS allows computers connected to the internet to look up the numeric internet address from the corresponding internet domain name.

LDAP, or the Lightweight Directory Access Protocol, is a protocol for quickly and easily accessing directory services. LDAP servers communicate using TCP/IP transfer services or similar transfer services making LDAP servers well suited for use over the internet or private company intranets.

An LDAP directory is made up of entries. Each entry may include attributes. Each attribute may have a value.

LDAP directories can be hierarchically arranged for more efficient searching. Hierarchical entries are commonly referred to as parent entries and child entries depending on their relationship to one another. For example, an entry representing a printer may be the child of an entry representing a computer in the case where the printer is connected to the computer.

Because both XML documents and directories may be hierarchically arranged, it is common to directly map an XML document into a directory. Mapping XML documents to directories may include creating a directory entry for each XML element and creating a directory entry attribute for every XML element attribute. This structural mapping is almost entirely 1-to-1 and may be relatively simple to perform. Some minor deviations from 1-to-1 structural mapping might be utilized. For example, XML elements that are unnamed might be assigned a numeric ID.

FIG. 2 is a directory entry 21 that has been mapped from the XML document shown in FIG. 1 using a 1-to-1 structural mapping. The Book element 12 from the XML document is mapped to a Book entry 22 within the directory. The Title attribute 13 belonging to the Book element 12 from the XML document is mapped to a Title attribute 23 belonging to the book entry 22 within the directory. The value 14 of the Title attribute 13 belonging to the Book element 12 from the XML document is mapped to a value 24 of the Title attribute 23 belonging to the book entry 22 within the directory. The child elements 17 and 18 of the Book element 12 from the XML document are mapped to child entries 25 and 26 of the Book entry 22 within the directory. Because the Book element 12 from the XML document is unnamed, the corresponding Book directory entry 22 may be assigned an arbitrary numeric ID 27, here 193 as an example, where necessary to conform to directory protocol.

This structural mapping allows the XML document to be stored to the directory while preserving the hierarchical structure. However, this method for storing XML documents to a directory has a number of drawbacks. For example, parsing the XML document so completely and storing such a large number of directory entries can be very time consuming. Additionally, searching for a desired XML document in a directory can be very time consuming when stored in this fashion and may require multiple directory queries that should be combined by a client application used to facilitate the query.

When a desired XML document is found within the directory, the document is retrieved entry by entry and converted back to XML elements and reassembled while maintaining the hierarchy to finally reproduce the original XML document. This process can be long and complicated and very time consuming.

Therefore, structural mapping of XML documents to directories can be a slow and inefficient process and may then lead to slow and inefficient searching of the XML document within the directory and a slow and inefficient restoring the directory back to the original XML document. It is therefore desirable to utilize a fast and efficient method for storing XML documents to directories that can be followed by a fast and efficient searching and restoring.

SUMMARY

A method for mapping a document to a directory includes providing an entry to the directory corresponding to the document, providing one or more search attributes to the entry containing one or more corresponding search terms, and providing a full-text attribute containing full text of the document to the entry.

A system for mapping a document to a directory includes a directory entry corresponding to the document, one or more search attributes for the directory entry containing one or more corresponding search terms, and a full-text attribute for the directory entry containing full text of the document.

A computer system includes a processor, and a program storage device readable by the computer system, embodying a program of instructions executable by the processor to perform method steps for mapping a document to a directory. The method includes providing an entry to the directory corresponding to the document, providing one or more search attributes to the entry containing one or more corresponding search terms, and providing a full-text attribute containing full text of the document to the entry.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 4 is a diagram representing a directory entry that is used to store an XML document;

FIG. 5 is a flow chart showing an embodiment of the present disclosure; and

DETAILED DESCRIPTION

Figure 1:
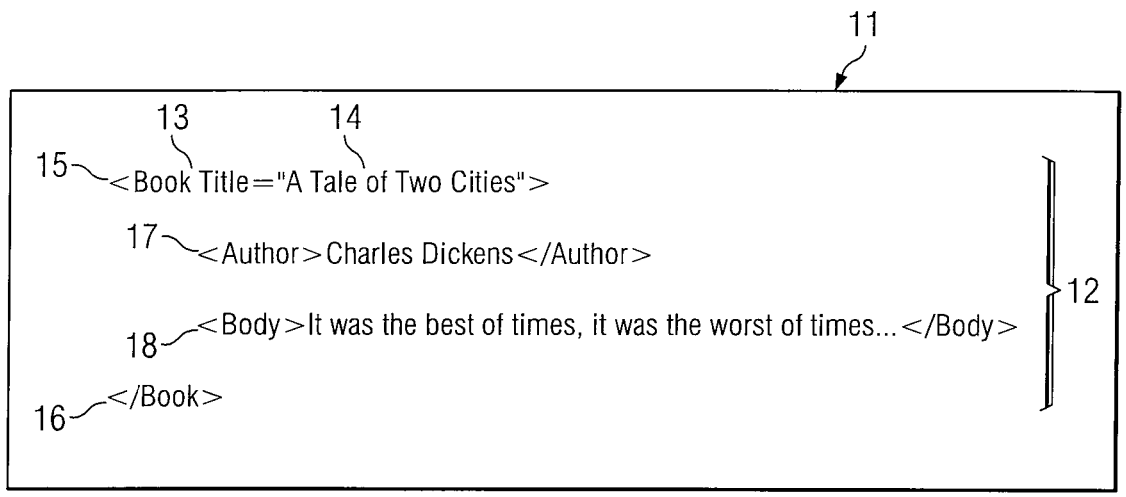
FIG. 1 shows an example of an XML document.
Figure 2:
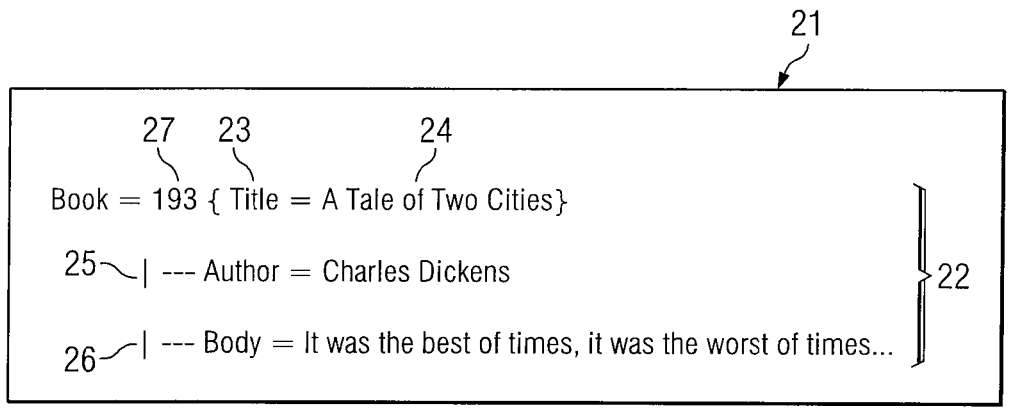
FIG. 2 is a directory entry that has been mapped from the XML document shown in FIG. 1 according to 1-to-1 structural mapping.

In describing the preferred embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Embodiments of the present disclosure may store XML documents to a directory and may allow for the fast and efficient searching and retrieval of XML documents from directory storage.

A directory schema may be constructed within a directory that receives stored XML documents according to embodiments of the present disclosure. A directory schema, is generally used to establish a structure of the directory and may include definitions of the entries that may be stored. Classes of entries may be included within the directory schema of embodiments of the present disclosure to define the entries that may later be included in the directory. These entry classes may be designed for each type of XML document that may be stored in the directory. For example, if an XML document representing a book is to be stored in the directory, an entry class representing a book may be defined in the directory schema.

Entry classes may include attributes. According to one embodiment of the present disclosure, each entry class should contain one attribute for each search term that the XML document being stored is likely to have. For example, if the XML document to be stored is a book, and a book entry class is added to the directory schema, that entry class might include an attribute for "Title" seeing how it is likely that a user may wish to search for a book by the book's title. Other attributes may include "Author" and "PublicationDate."

It may not be necessary to create an attribute for every individual feature of the XML document, it may be sufficient to include attributes only for those features that a user is likely to search for. By creating the attributes, searching a directory for a particular attribute may be more efficient and faster that searching through the entire hierarchy of entries of a directory that has been created from an XML document according to a 1-to-1 structural mapping.

Entry classes may also include an attribute for the XML document. The value for this attribute may be the full and unparsed XML document. This attribute is used to return the XML text to a user who has successfully searched for an XML document. There may also be an attribute for an XML summary. This attribute might contain a single word or a sample of the XML document. For example, the summary field may simply be the first 10 lines of the full XML document. A user might then request that results be returned by displaying the summary instead of the full text. For example, a user might want to search for books by a particular author and have the summary of the XML document books displayed as search results.

Figure 3:
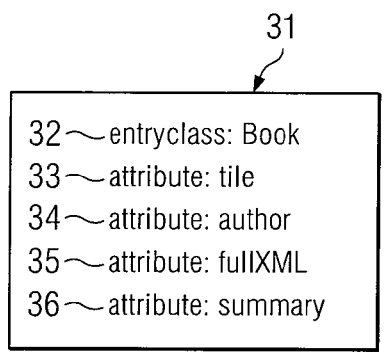
FIG. 3 is a diagram representing a directory schema for mapping the XML document of FIG. 1 to a directory according to embodiments of the present disclosure.

FIG. 3 is a diagram representing a directory schema for mapping the XML document of FIG. 1 to a directory according to embodiments of the present disclosure. In this schema 31, an entry class for a book is defined 32. The book entry class 32 has a title attribute 33, an author attributer 34, a full XML text attribute 35, and a summary attribute 36.

This schema 31 may be used to establish an entry class for storing XML documents as books. Where XML documents to be stored to a directory are of a type other than books, an entry class can be defined in the schema 31 for other types of XML documents. It may be possible to have multiple entry classes defined in the schema 31. Each defined entry class may have an attribute for the full XML text 35 and a summary 36. Each defined entry class may also have one or more attributes for features of the XML documents to be stored to the directory that a user would be likely to use to search with.

FIG. 4 is a diagram representing a directory entry that is used to store an XML document. This directory entry continues to use the example XML document of FIG. 1 and uses the schema shown in FIG. 3. Here an entry 41 is created to store the XML document of FIG. 1. The entry class book 32 is given the value 42 "A Tale of Two Cities." For this example, the title is the value used for the entry class; however any descriptive attribute may be used as the value for the entry class. Here the title is used because it is a natural way to refer to books. The title attribute 33 is given a value "A Tale of Two Cities" 43. Here the title is one of the attributes that a user may search for the XML document with. The author attribute 34 is given a value Charles Dickens 44. Here the author is one of the attributes that a user may search for the XML document with.

The full XML text attribute 35 is given a value equal to the entire XML document 11. When this XML document is retrieved for a user, for example as a search result, the full text of the XML document 45 may be returned to the user. The summary attribute 36 is given a value equal to the first two lines of the XML document 11. The value 46 of the summary attribute 36 may be any predetermined section of the XML document 11. For example, the value 46 of the summary attribute 36 may be the first two lines of the XML document 11, as used in FIG. 4. In another example, the value 46 of the summary attribute 36 may be the first 10 lines of the XML documents or a set number of characters, for example, the first 200 characters. When this XML document 11 is retrieved for a user, for example as a search result, the summary 46 may be returned to the user.

FIG. 5 is a flow chart showing an embodiment of the present disclosure. In storing an XML document to a directory according to embodiments of the present disclosure, a directory schema may be created (Step S51). This schema may define the entry classes and associated attributes used in storing XML documents to the directory. One or more entries may be added to the directory (Step S52). One entry should be added for each XML document that is added to the directory. Each entry should conform to an entry class defined in the schema. One or more search attributes should be added to each entry (Step S53). These search entries may permit the quick and efficient searching of the directory for XML documents. A full XML document text attribute should be added to each entry (Step S54). This attribute may be the entire unparsed XML document. This attribute may be returned to a user who has conducted a search. A summary attribute should be added to each entry (Step S55). This attribute may be a portion of the XML document. This attribute may be returned to a user who has conducted a search in place of the full text attribute, for example, where desired by the user.

Figure 6:
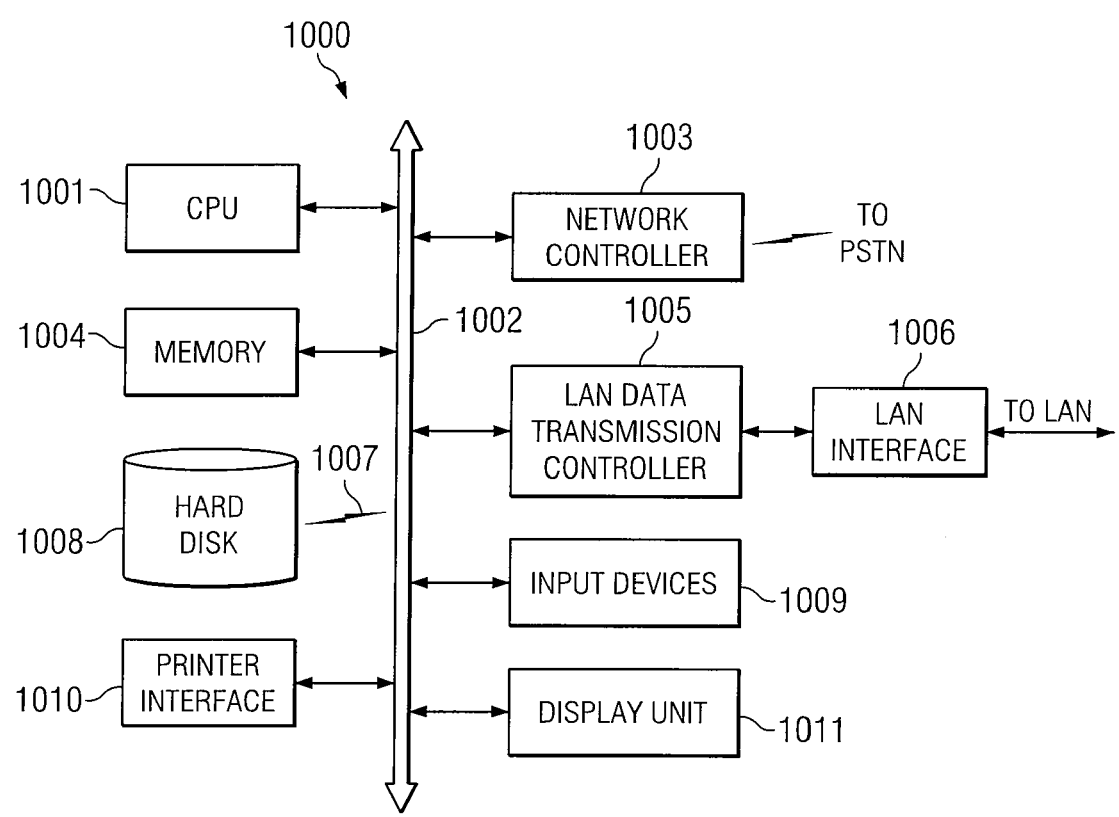
FIG. 6 shows an example of a computer system capable of implementing the method and apparatus according to embodiments of the present disclosure.

FIG. 6 shows an example of a computer system which may implement the method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal buss 1002, and one or more input devices 1009, for example, a keyboard, mouse etc. As shown, the system 1000 may be connected to a data storage device, for example, a hard disk, 1008 via a link 1002.

The above specific embodiments are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

What is claimed is:

1. A method for mapping a document to a directory, comprising:

establishing an entry in a directory corresponding to a document, the document comprising an unparsed XML document;

storing one or more search attributes in the entry containing one or more corresponding search terms, each of the one or more corresponding search terms having a particular value selected from the unparsed XML document;

storing a full-text attribute containing the unparsed XML document in the entry;

storing a summary attribute containing at least a portion of the unparsed XML document in the entry, wherein the summary attribute, the full-text attribute, and the one or more search attributes are stored as separate attributes in the entry;

receiving a search request comprising at least one search parameter;

identifying the entry in the directory by comparing the at least one search parameter to the one or more search attributes in the entry;

retrieving the summary attribute; and transmitting data operable to display the summary attribute.

2. The method of claim 1, wherein the directory is an LDAP directory.

3. The method of claim 1, wherein the directory conforms to one or more X.500 standards.

4. The method of claim 1, further comprising providing a directory schema for defining the entry and the attributes that are provided.

5. A system for mapping a document to a directory, comprising:

a computer-readable medium; and a processor, the processor operable to execute a program of instructions encoded on the computer-readable medium, the program of instructions comprising:

a directory entry in a directory corresponding to a document, the document comprising an unparsed XML document;

one or more search attributes for the directory entry containing one or more corresponding search terms, each of the one or more corresponding search terms having a particular value selected from the unparsed XML document;

a full-text attribute for the directory entry containing the unparsed XML document;

a summary attribute containing at least a portion of the text of the unparsed XML document in the entry, wherein the summary attribute, the full-text attribute, and the one or more search attributes are stored as separate attributes in the entry, and wherein the program of instructions is operable to:

receive a search request comprising at least one search parameter;

identify the entry in the directory by comparing the at least one search parameter to the one or more search attributes in the entry;

retrieve the summary attribute; and transmit data operable to display the summary attribute.

6. The system of claim 5, wherein the directory is an LDAP directory.

7. The system of claim 5, wherein the directory conforms to one or more X.500 standards.

8. The system of claim 5, wherein the program of instructions further comprises a directory schema for defining the entry and the attributes that are provided.

9. A computer system comprising:

a processor; and a program storage device readable by the computer system, embodying a program of instructions executable by the processor to perform method steps for mapping a document to a directory, the method comprising:

establishing an entry in the directory corresponding to the document, the document comprising an unparsed XML document;

storing one or more search attributes in the entry containing one or more corresponding search terms, each of the one or more corresponding search terms having a particular value selected from the unparsed XML document;

storing a full-text attribute containing the unparsed XML document in the entry;

storing a summary attribute containing at least a portion of the unparsed XML document in the entry, wherein the summary attribute, the full-text attribute, and the one or more search attributes are stored as separate attributes in the entry;

receiving a search request comprising at least one search parameter;

identifying the entry in the directory by comparing the at least one search parameter to the one or more search attributes in the entry;

retrieving the summary attribute; and transmitting data operable to display the summary attribute.

10. The computer system of claim 9, wherein the directory is an LDAP directory.

11. The computer system of claim 9, wherein the directory conforms to one or more X.500 standards.

12. The computer system of claim 9, further comprising providing a directory schema for defining the entry and the attributes that are provided.

* * * * *